United States Patent
Mears et al.

(10) Patent No.: US 10,720,728 B2
(45) Date of Patent: Jul. 21, 2020

(54) ELECTRICAL CONNECTOR SEALING SYSTEM

(71) Applicant: GE AVIATION SYSTEMS LLC, Grand Rapids, MI (US)

(72) Inventors: John S. Mears, Cincinnati, OH (US); Samuel Robert Hathaway, Cincinnati, OH (US); Daniel Alan Niergarth, Norwood, OH (US); David George Kloos, Dayton, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 16/189,523

(22) Filed: Nov. 13, 2018

(65) Prior Publication Data
US 2020/0153155 A1 May 14, 2020

(51) Int. Cl.
| H01R 13/52 | (2006.01) |
| H02G 3/36 | (2006.01) |
| B23P 11/00 | (2006.01) |
| B64D 41/00 | (2006.01) |

(52) U.S. Cl.
CPC ........ H01R 13/5208 (2013.01); B23P 11/005 (2013.01); H02G 3/36 (2013.01); B64D 41/00 (2013.01)

(58) Field of Classification Search
CPC .................................................. H01R 13/5208
USPC ................. 439/274, 275, 279, 589
See application file for complete search history.

(56) References Cited

U.S. PATENT DOCUMENTS

| 2,265,341 | A | | 12/1941 | Borchert et al. |
| 2,563,762 | A | | 8/1951 | Rowell et al. |
| 3,125,395 | A | | 3/1964 | Swanson |
| 3,182,280 | A | | 5/1965 | Daut et al. |
| 3,221,292 | A | | 11/1965 | Barnhart et al. |
| 3,287,687 | A | | 11/1966 | Mosher |
| 3,681,517 | A | | 8/1972 | Meyn et al. |
| 3,850,495 | A | * | 11/1974 | Glover .................. H01R 13/53 439/273 |
| 4,082,398 | A | | 4/1978 | Bourdon et al. |
| 4,220,385 | A | | 9/1980 | Luca et al. |
| 4,993,964 | A | | 2/1991 | Trummer |
| RE38,294 | E | * | 11/2003 | Nattel ...................... H01R 9/03 174/59 |

(Continued)

FOREIGN PATENT DOCUMENTS

| FR | 2842033 A1 | 1/2004 |
| GB | 1590403 A | 6/1981 |

OTHER PUBLICATIONS

European Patent Office, Extended European Search Report re Corresponding Application No. 19208129.7-1201, dated Mar. 25, 2020, 9 Pages, Munich, Germany.

*Primary Examiner* — Ross N Gushi
(74) *Attorney, Agent, or Firm* — McGarry Bair PC

(57) ABSTRACT

A method and apparatus for a crimp pin electrical connector can include a body with a first face and a second face, with openings extending through the body from the first face to the second face. A grommet can connect to the body with grommet holes aligned with the openings. A cap having a set of cap holes can align with the grommet holes. A nut can threadably engage with the body to compress the grommet via the cap to seal wires connected to the body with an interference.

16 Claims, 6 Drawing Sheets

(56) References Cited

U.S. PATENT DOCUMENTS 6,716,063 B1 * 4/2004 Bryant ............... H01R 13/5208
439/589
6,872,092 B2   3/2005 Oka

* cited by examiner

ELECTRICAL CONNECTOR SEALING SYSTEM

BACKGROUND OF THE INVENTION

Contemporary aircraft use avionics in order to control the various equipment and operations for flying the aircraft, among other electrical components. Often electrical components require crimp pin connectors to electrically or communicatively couple separate electrical components. Occasionally, these connectors are subject to fluid leakage at the connector, which can provide contamination of the local electrical components.

Currently, in order to fluidly seal such connections, a large hermetic seal can be formed around the connector such as with a glue or epoxy, which is large and bulky, and can be difficult to remove. Optionally, a fill can be provided to fill between the wires to seal the wires. However, such a fill is not removable and any inspection or maintenance necessarily requires replacement of the connector.

BRIEF DESCRIPTION OF THE INVENTION

In one aspect, the disclosure relates to a crimp pin connector comprising: a body having first and second faces, a first set of pins extending from the first face, a first threaded portion about the body and proximate the first face; a grommet having a set of holes, defining a set of grommet holes, corresponding to and receiving the first set of pins when the grommet is proximate the first face; a cap having a set of holes, defining a set of cap holes, corresponding to and aligned with the set of grommet holes when the cap is proximate the grommet; and a nut having a second threaded portion threadably engaged with the first threaded portion and retaining the cap against the grommet.

In another aspect, the present disclosure relates to A crimp pin connector comprising: a body having a first face with a first set of pins extending from the first face and a first threaded portion about the body proximate the first face; a grommet having a first end, a second end, and a set of grommet holes extending between the first end and the second end corresponding to and receiving the first set of pins when the grommet is proximate the first face; a cap having a set of cap holes corresponding to and aligned with the set of grommet holes; and a nut having a second threaded portion threadably engaged with the first threaded portion and retaining the cap against the grommet.

In yet another aspect, the present disclosure relates to a method of coupling a set of wire leads to a crimp pin connector including a body, a grommet, a cap, and a nut, the method comprising: inserting the set of wire leads through the nut, the cap, and the grommet to couple the set of wire leads to the body; and threading the nut to the body to compressively retain the cap against the grommet, compressing the grommet between the body and the cap; wherein compression of the grommet retains and seals the set of wire leads at the body.

DETAILED DESCRIPTION OF THE INVENTION

Figure 1:
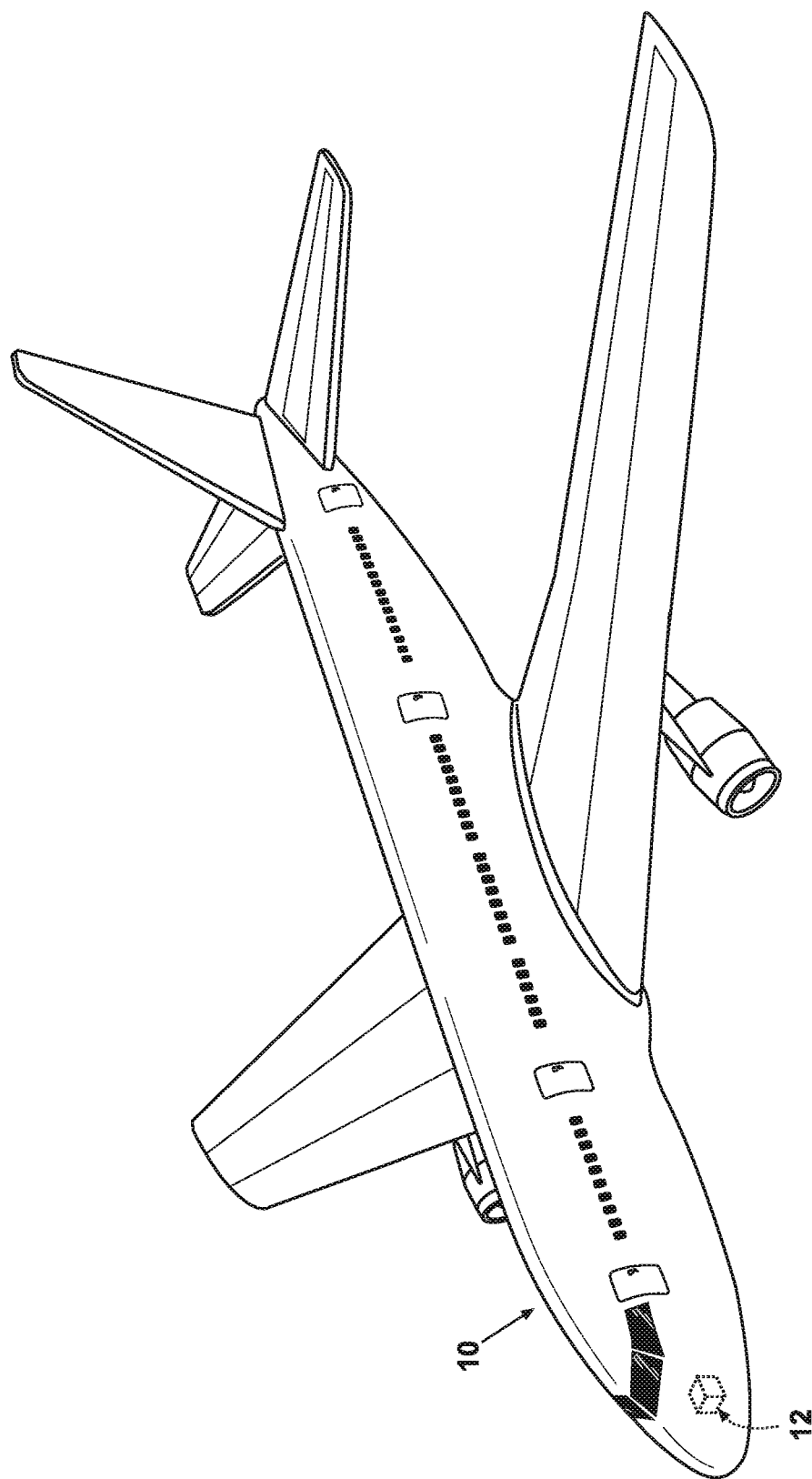
FIG. 1 is a perspective view of an aircraft having an avionics chassis with electrical components in accordance with various aspects described herein.

Aspects of the disclosure relate to an improved crimp pin connector that provides for a fluid seal at the wire line connection as well as provides for easy disassembly, inspection, and reassembly, as well as reduced size and weight. Avionics including electrical components, as well as other engine components, are constantly challenged with dissipating the heat produced within the increasing thermal production within the aircraft environment, which can require the use of local liquids or fluids for heat dissipation, which can require improved sealing within the electrical assemblies. Additionally, sensors or other electrical elements may be provided in contaminable locales, such as those in a fuel tank or an oil conduit, requiring sealing within such locales.

While the description will generally pertain to an avionics chassis within an aircraft, it should be appreciated that the crimp pin connector can be applicable to a myriad of elements or implementations, such as any electronics chassis, electronics components, motors such as those in an aircraft engine or not in an aircraft, or any other electrical assembly utilizing crimp pin connectors, for example. Therefore, the crimp pin connector as described herein will also have applicability in other environments where sealed electrical connections are desirable, such as non-aircraft, terrestrial, or other environments, as well as any other electrical environment.

While "a set of" various elements will be described, it will be understood that "a set" can include any number of the respective elements, including only one element. Additionally, all directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

FIG. 1 schematically illustrates an aircraft 10 with an on-board avionics chassis 12 (shown in broken-line) for housing avionics, electronics, electrical components, or avionics components for use in the operation of the aircraft 10. The avionics chassis 12 houses a variety of avionics elements and protects them against contaminants, electromagnetic interference (EMI), radio frequency interference (RFI), vibrations, and the like. While illustrated in a commercial airliner, the avionics chassis 12 can be used in any type of aircraft, for example, without limitation, fixed-wing, rotating-wing, rocket, commercial aircraft, personal aircraft, and military aircraft, as well as any vehicle requiring similar protection. The avionics chassis 12 can be located anywhere within the aircraft, not just the nose as illustrated. Furthermore, aspects of the disclosure are not limited only to aircraft aspects, and can be included in other mobile and stationary configurations. Non-limiting example mobile configurations can include ground-based, water-based, or additional air-based vehicles. Further yet, aspects of the disclosure are not limited to that of an avionics chassis, but any portion of the aircraft electrical connections are made or crimp pin electrical connectors are utilized. Further still, the electrical connections can be those made in an oil-wetted cavity, such as within an on-engine electric motor or generator, where it is desirable to seal the electrical connectors from the wetted cavity.

Figure 2:
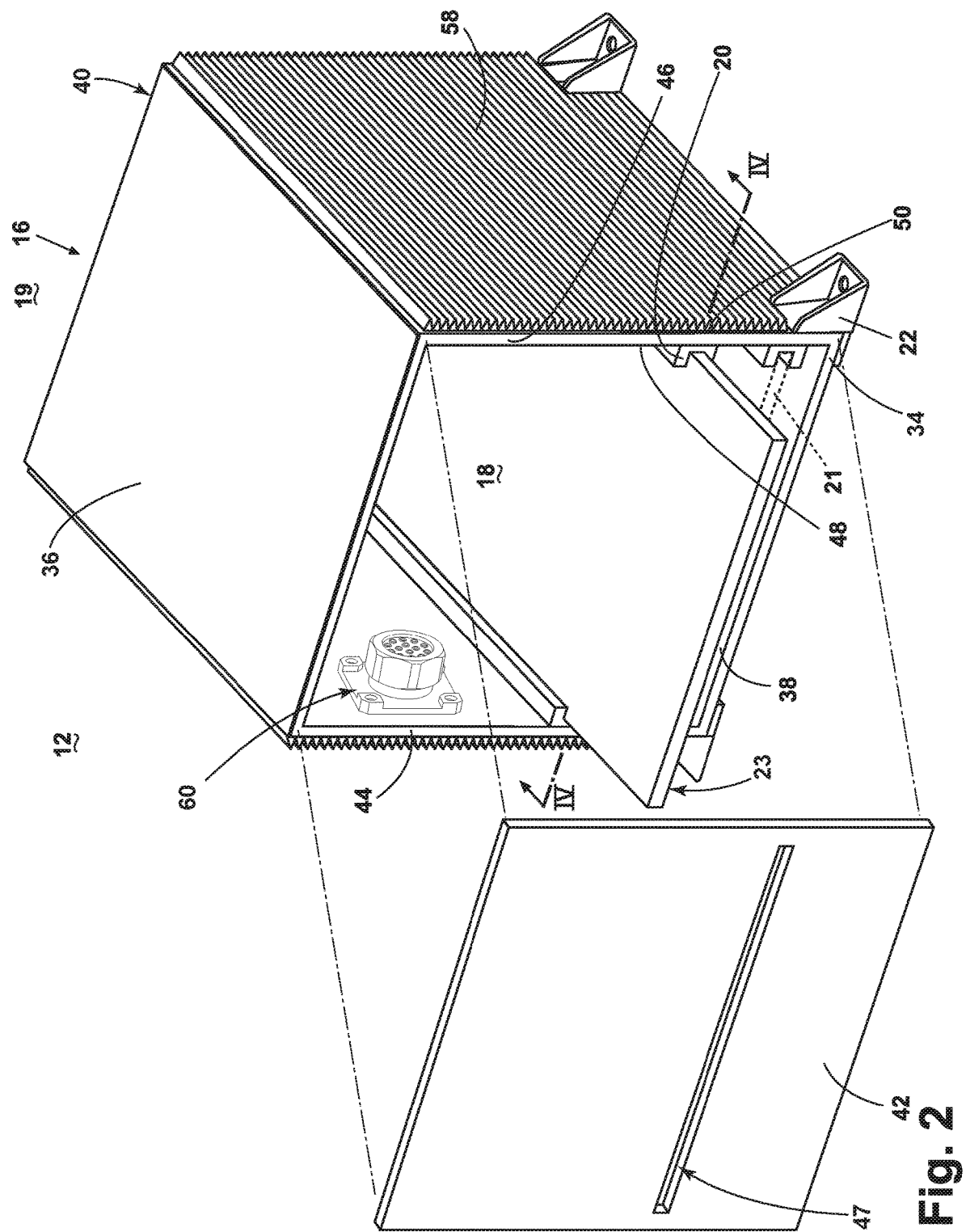
FIG. 2 is an enlarged, partially exploded perspective view of the avionics chassis of FIG. 1, with a cover removed for clarity and including a crimp pin electrical connector.

FIG. 2 illustrates the avionics chassis 12 according to an aspect of the present disclosure, with a front cover 42 removed. The avionics chassis 12 includes a chassis housing 16 defining an interior 18 and exterior 19 of the chassis 12. The avionics chassis 12 can includes a chassis frame 34 having a top cover 36, a bottom wall 38, a back wall 40, and opposing sidewalls 44, 46, collectively referred to as the walls. The frame 34 can further include the aforementioned selectively removable front cover 42, providing access to the interior 18 of the avionics chassis 12 when removed, and partially restricting access to the interior 18 when coupled or mounted with the frame 34. The sidewalls 44, 46 can include an interior surface 48 and an exterior surface 50. As shown, a set of heat-dissipating elements, such as fins 58, can project from the exterior surface 50 of the walls 44, 46. While heat-dissipating fins 58 are shown, a number of heat-dissipating elements or heat-dissipating configurations can be utilized by the sidewalls 44, 46 to remove or dissipate at least a portion of heat generated by or within the avionics chassis 12, or heat stored by the avionics chassis 12.

The avionics chassis 12 can further include a set of thermally conductive card rails 20 within the interior 18 and supported by the interior surface 48 of the sidewalls 44, 46. The set of card rails 20 can be horizontally aligned on the interior surfaces 48 of the spaced on opposing side walls 44, 46 to define effective card slots 21 (illustrated by the dotted lines) there between for receiving at least a portion of an operable avionics system card 23. While only a single avionics system card 23 is shown, the avionics chassis 12 can be configured to house, support, or include a set of avionics system cards 23.

The removable front cover 42 can be selected or configured to include a set of cover openings 47 that can be aligned with a corresponding set of avionics system cards 23 such that when the front cover 42 is coupled or mounted with the frame 32, at least a portion of the avionics system card 23 can extend from the interior 18 to the exterior 19 of the avionics chassis 12. Stated another way, the avionics chassis 12 or the avionics system card 23 can be selected or configured such that at least a portion of an avionics system card 23 can extend through a corresponding opening 47 or aperture in the chassis 12 or front cover 42. In this sense, the opening 47 can be sized, shaped, profiled, or contoured to align or correspond with at least a portion of the avionics system card 23. While the avionics system card 23 is illustrated extending through an opening 47 in the front cover 42, aspects of the disclosure can be included wherein the avionics system card 23 is selected, designed, or configured such that at least a portion of the card 23 extends beyond or past a physical or referential plane defined by the avionics chassis 12, front cover 42, side walls 44, 46, frame 34, or combination of boundaries thereof.

The avionics chassis 12 is further illustrated including a set of mounting feet 22 extending from the chassis housing 16 to facilitate mounting the avionics chassis 12 to the aircraft 10 by means of bolts or other conventional fasteners. Further, the mounting feet 22, can function as an electrical ground for grounding the avionics chassis to the frame of the aircraft 10. While mounting feet 22 are shown in this example the avionics chassis 12 can be used with many types of attachment mechanism.

Figure 3:
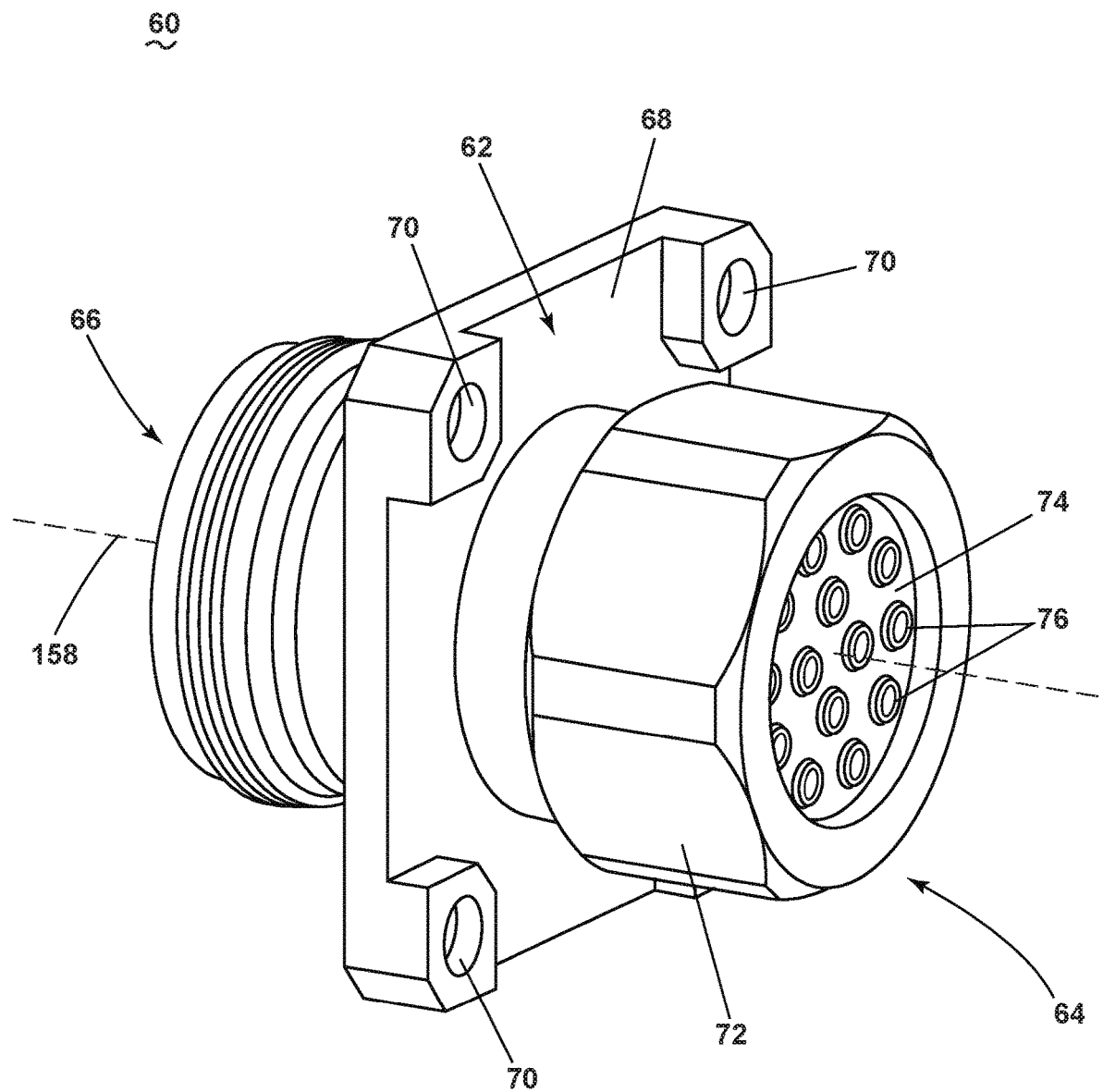
FIG. 3 is a perspective view of the crimp pin electrical connector for use in the avionics chassis of FIG. 2.

A crimp pin electrical connector 60 can mount on the interior surface 48 of the avionics chassis 12. Referring now to FIG. 3, the crimp pin electrical connector 60 includes a body 62 having a first end 64 and a second end 66 defining a longitudinal axis 158 extending between the first end 64 and the second end 66. The body 62 can be any suitable crimp-pin connector body or electrical wire connector, such as any commercial-off-the-shelf or custom connector. A mount plate 68 is formed in the body 62, including a set of fastener apertures 70 provided in the mount plate 68 for mounting the crimp pin electrical connector 60. A nut 72 and a cap 74 are provided at the first end 64, including a set of wire inlets 76 for accepting and connecting a set of wires to the body 62. The nut 72 and the cap 74 can be made of steel, for example, while other materials are contemplated, such as non-conductive materials like plastics. When a set of wires is connected to the crimp pin electrical connector 60 at the inlets 76, another connector (not shown) can couple to the set of wires extending through the crimp pin electrical connectors 60, preferably having a set of crimp pins affixed on the ends of the set of wires to permit connection of another electrical connector.

Figure 4:
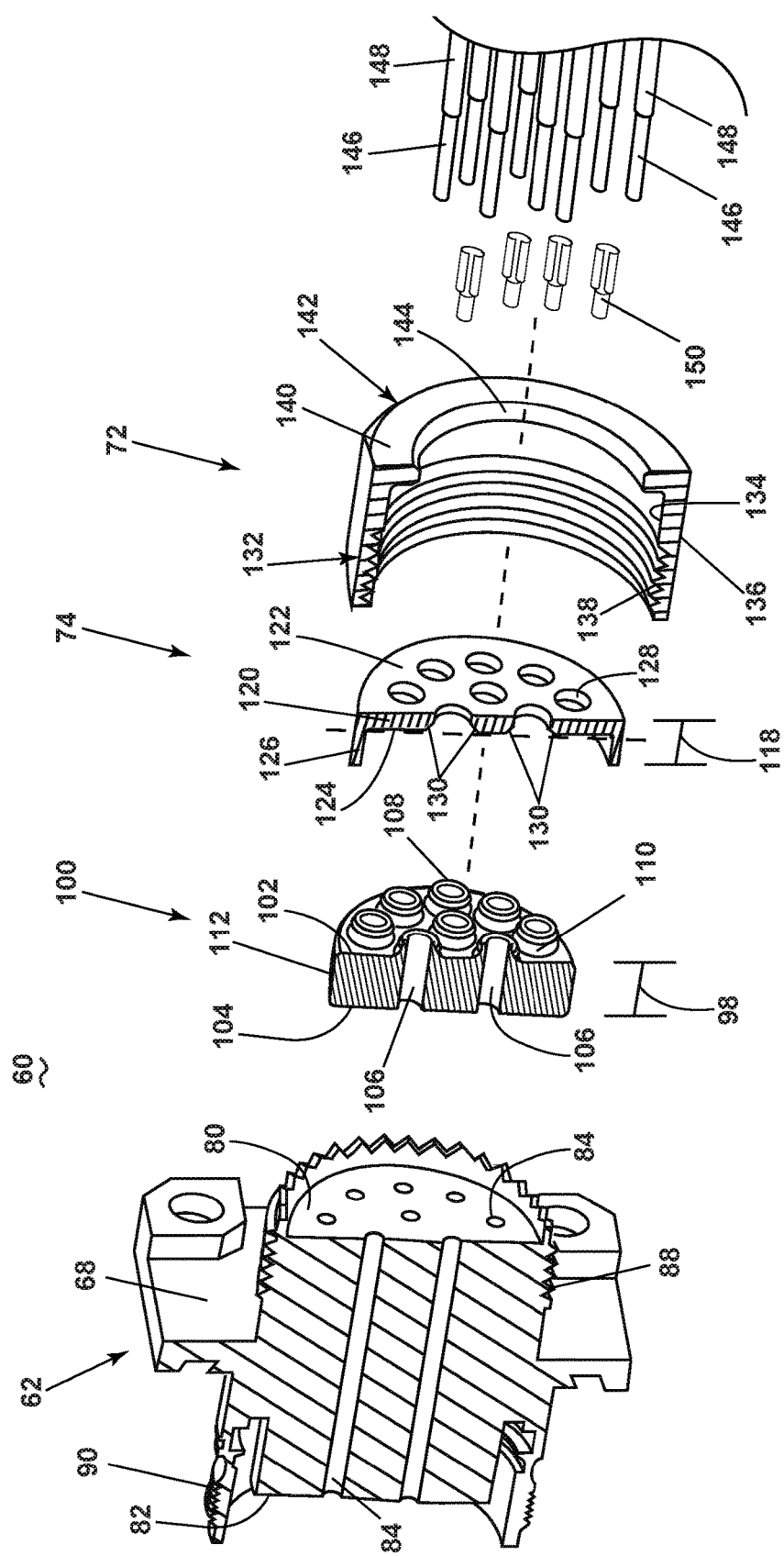
FIG. 4 is an exploded sectional view of the crimp pin electrical connector of FIG. 3.

Referring now to FIG. 4, the body 62 further includes a first face 80 at the first end 64 and a second face 82 at the second end 66. A first set of wire openings 84 are provided in the first face 80 and extend through the body 62 to terminate at the second face 82. A first threaded portion 88 is provided about the body 62 proximate the first face 80 and spaced from the mount plate 68. A second threaded portion 90 is provided about the body proximate the second face 82, opposite of the first threaded portion 88, relative to the mount plate 68. While the body 62 is illustrated as a monolithic, unitary member, it is further contemplated that the body 62 can include multiple parts, such as an exterior sheath including the first and second threaded portions 88, 90, while the interior may be comprised of one or more different materials, for example. In one particular example, the body 62 can include a material or portion design to anchor one or more crimp pin connectors extending through the body 62 to position a set of crimp pins protruding from the second face 82.

A grommet 100 includes an outer surface as a first grommet end 102 and an inner surface as a second grommet end 104, the outer and inner surfaces defined relative to the body 62. A grommet thickness 98 can be defined as the length between the first grommet end 102 and the second grommet end 104. A peripheral side 112 forms the outer periphery of the grommet 100, extending between the first and second grommet ends 102, 104. The second grommet end 104 can be sized to abut the first face 80 of the body 62. A set of holes are provided in the grommet 100, defining a set of grommet holes 106. The grommet holes 106 correspond to and are complementary to the wire openings 84. A set of nipples 108 are formed in the grommet 100 at the first grommet end 102, extending from the first grommet end 102 and partially defining the set of grommet holes 106. Each nipple 108 can include a thickened portion 110 adjacent the first grommet end 102, being wider and thicker than the remainder of the nipple 108 distal from the first grommet end 102. The grommet can be made of a compressible, sealing material, such as fluorocarbon or fluorosilicone, while any suitable compressible material is contemplated, such as rubbers, silicones, carbons, or other materials resistant to leakage and decay that are not electrically conductive can be utilized.

The cap 74 includes a front cap wall 120 having a first cap surface 122 and a second cap surface 124, with the second cap surface 124 adapted to abut against the first grommet end 102. A cap sidewall forms a collar 126 that extends from the front cap wall 120 and has a length 118 that is less than the thickness 98 of the grommet 100, such that when the front cap wall 120 abuts the grommet 100, the collar 126 terminates prior to the second grommet end 104. A plurality of cap holes 128 are provided in the front cap wall 120 arranged complementary to the grommet holes 106 of the grommet 100. The cap holes 128 can be sized complementary to the nipples 108 adapted to receive the nipples 108 when the cap 74 abuts the grommet 100. The cap holes 128 can further include a bevel 130 at the second cap surface 124, forming an increased area of the cap holes 28 at the second cap surface 124 as compared to the first cap surface 122. In one example, the bevel 130 can be provided at a 45-degree angle relative to the second cap surface 124, while other angles are contemplated, such as a 30-degree or a 60-degree angle in two additional non-limiting examples. In another example, the body 62 at the first surface 80 can extend further from the first set of threads 88. In such an example, the collar 126 need not have a length 118 that is less than the thickness 98 of the grommet 100 and still provide for compression of the grommet 100. In yet another example, the cap 74 can be two-part, with the front cap wall 120 and the collar 126 as two separate parts, delineated with a broken line in FIG. 4. In such an example, the cap can be a flat, disk formed as the front cap wall 120, and the collar 126 could be separate, adapted to position around the grommet 100 to set the compression of the grommet 100 and form an anti-rotation surface when mating with the body 62. Such a two-part cap 74 could be utilized to determine the particular compression provided to the grommet 100 to tailor to the particular connector.

The nut 72 includes a peripheral nut wall 132 having an interior nut surface 134 and an exterior nut surface 136. The interior nut surface 134 can include a nut thread 138 partially forming the interior nut surface 136, adapted to thread to the first threaded portion 88 of the body 62. The exterior nut surface 136 can have a hexagonal shape, facilitating rotational fastening of the nut 72 to the body 62, such as with a wrench or other tool. In one alternative example, the nut 72 could be a circular shape with a knurled or other texture to facilitate hand-tightening of the nut 72. A rim 140 extends radially inward from the peripheral nut wall 132 at a first nut end 142 and defines a nut opening 144 in the nut 72. The rim 140 can be sized to abut the outer periphery of the front cap wall 120 without covering any of the cap holes 128 in the front cap wall 120, such that the cap holes 128 are accessible through the nut opening 144.

A set of wire leads 146 having an insulated covering 148 are included for coupling to the crimp pin electrical connector 60. Additionally, one or more crimp pins 150 can be attached to the ends of the wire leads 146 for extending from the second face 82 of the body 62. While shown as only four crimp pins 150, it should be appreciated that the number of crimp pins 150 can be complementary to the number of wire leads 146 in the set of wire leads 146. The crimp pin 150 can be any standard wire crimp, or any suitable commercial-off-the-shelf (COTS) wire crimp connector, for example.

Figure 5:
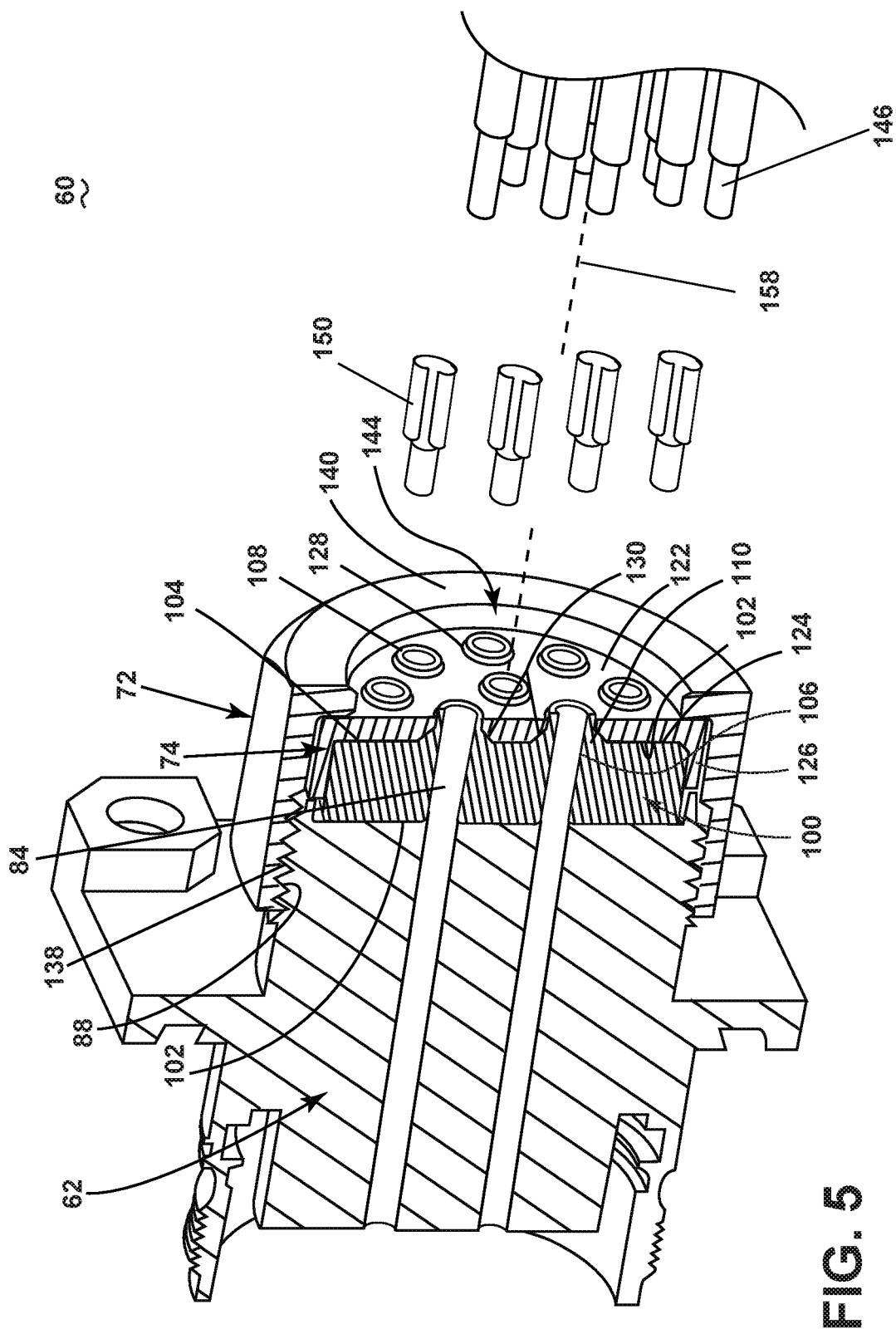
FIG. 5 is an assembled sectional view of the crimp pin electrical connector of FIG. 4, with wire leads exploded from the crimp pin electrical connector.

Referring now to FIG. 5, the crimp pin electrical connector 60 is shown as assembled in cross section to better illustrate the interaction of the components interior of the nut 72. The grommet 100 is provided abutting the first face 80 of the body 62.

The cap 74 is provided over the grommet 100, with the collar 126 surrounding the grommet 100, spaced from the first face 80 of the body 62, and extending partially between the first grommet end 102 and the second grommet end 104 of the grommet 100. The second cap surface 124 abuts the first grommet end 102 with the nipples 108 extending through the cap holes 128. The nipples 108 can abut the bevel 130 of the cap 74, such that movement of the cap 74 toward the grommet 100 compresses the thickened portion 110 of the nipples 108, while the remainder of the nipples 108 protrude through the cap holes 128.

The nut thread 138 threads onto the body 62 at the first threaded portion 88, fastening the nut 72 to the remainder of the crimp pin electrical connector 60. During threading, the rim 140 abuts the first cap surface 122 and continued threading pushes the cap 74 toward the grommet 100 compressing the grommet 100. Such compression of the grommet 100 directs a compressive force from the grommet 100 toward the grommet holes 106, as well as from the bevel 130 on the cap 74 to the thickened portion 110 of the nipples 108. Such compression of the grommet 100 acts as a seal against the wire leads 146.

Prior to threading the nut 72 onto the body 62, the wire leads 146 can connect to one or more crimp pins 150 and can be inserted through the cap holes 128 and the nipples 108 to protrude from the second face 82, and the nut 72 can be slid around the wire leads 146, with the wire leads 146 extending through the nut opening 144 of the nut 72.

A process for assembly of the crimp pin electrical connector 60 can include: (1) attaching crimp pins 150 to each end of the wire leads 146; (2) inserting the wire bundle including all wire leads 146 through the nut 72 such that the nut 72 is provided around the wire leads 146; (3) inserting each individual wire of the wire leads 146 through the cap holes in the cap 74; (4) inserting each individual wire of the wire leads 146 through the grommet holes 106 in the grommet 100; (5) the individual wires of the wire leads 146 can be inserted into and secured within the body 62 such that the attached crimp pins 150 extend from the second surface 82; (6) the grommet 100 can slide up the wire bundles of wire leads 146 such that the second grommet end 104 abuts the first face 80 of the body 62; (7) the cap 74 slides up the wire bundle along the wire leads 146 such that the second cap surface 124 abuts the first grommet end 102 and the nipples 108 extend through the cap holes 128 in the cap 74; (8) the nut 72 slides up the wire bundle of wire leads 146 the rim 140 abuts the first cap surface 122 of the cap 74; and (9) the nut 72 is threaded and tightened to the first threaded portion 88 of the body 62, compressing the grommet 100 to effectively reduce the diameter of the grommet holes 106 to tightened and seal at the wire leads 146. Optionally, the cap 74 can include an anti-rotation feature, such as a lock mechanism, to prevent undesired rotation of the cap 74 within the electrical connector 60.

Figure 6:
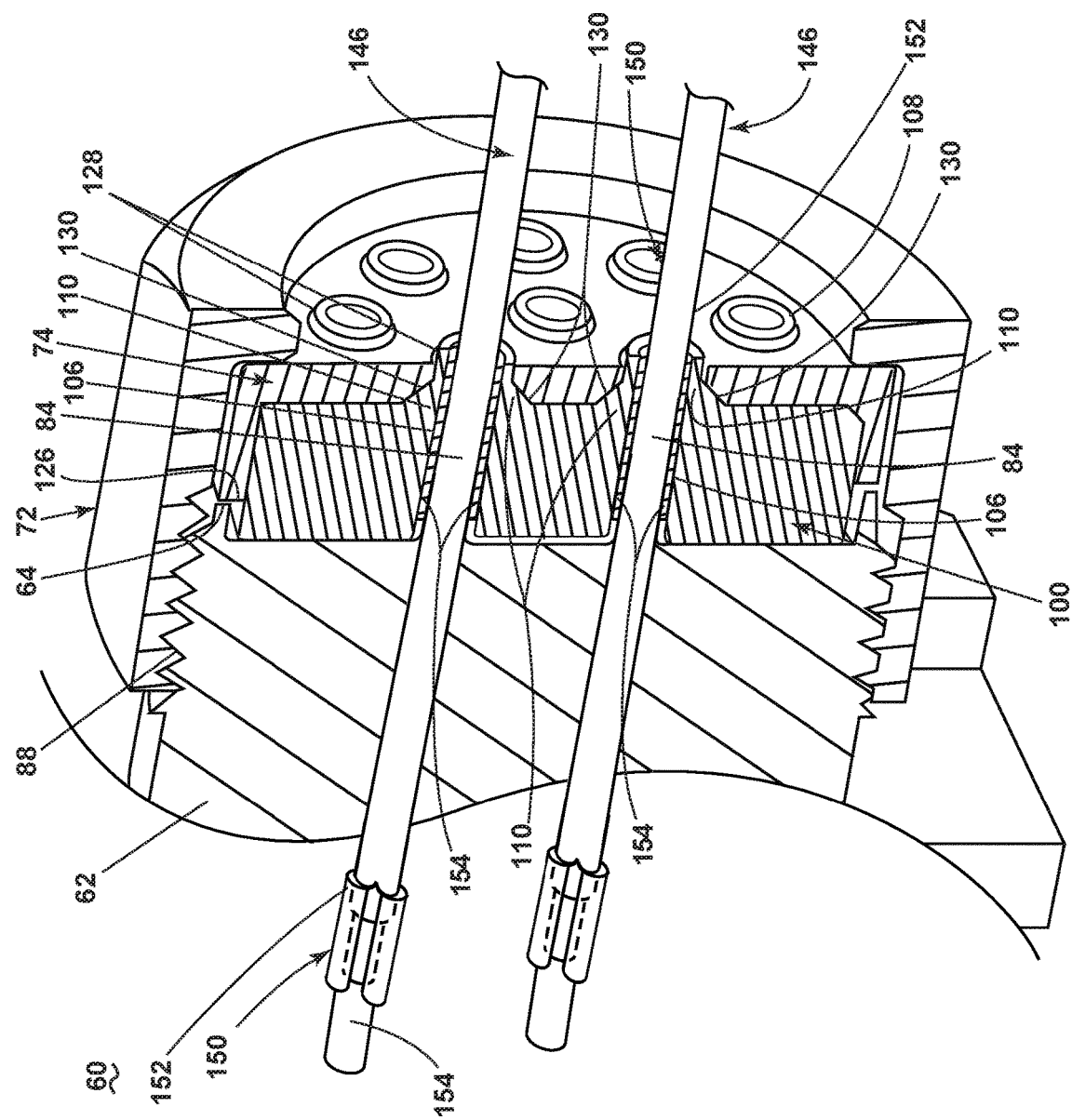
FIG. 6 is the sectional view of FIG. 5 with the wire leads coupled to the crimp pin electrical connector via a crimp pin.

Referring now to FIG. 6, the assembled crimp pin electrical connector 60 is coupled with the wire leads 146 and the crimp pins 150, and inserted into the nut 72, the cap 74, the grommet 100, and the body 62. While only two wire leads 146 are shown as coupled to the crimp pin electrical connector 60, it is contemplated that any number of wire leads 146 can be coupled to the crimp pin electrical connector 60, such as one lead per grommet hole 106, and only the two wire leads 146 are shown for simplicity of description and to facilitate understanding. Additionally, the body 62 is shown as cut to permit the enlarged view, but it should be appreciated that the crimp pins 150 can extend from the second face 82 of the body 62.

The wire leads 146 are coupled to a crimp pin 150 at a crimp 152, terminating at a connector end 154. The wire leads 146 extend through the cap holes 128 and the nipples 108, and into the grommet holes 106.

Once the wire leads 146 are inserted, the nut 72 threadably tightens to the body 62 at the first threaded portion 88, pushing the cap 74 toward the body 62, squeezing and compressing the grommet 100. Threading the nut 72 retains the cap against the grommet 100. While described herein as a threaded connection between the body 62 and the nut 72, other connections are contemplated, such as a bayonet, a push and twist-type connection, or a click-lock connection, or any connection that resists rotational movement of the electrical connector. The extent that the nut 72 can be threaded onto the body 62 can be limited by the first end 64 of the body 62 abutting the end of the collar 126, and such sizing can be particularly tailored to the specific crimp pin electrical connector 60 to determine a preferred compressible force of the cap 74 against the grommet 100.

Compressing the grommet 100 secures the wire leads 146 and the crimp pins 150 within the body 62 and collapses the grommet 100 about the wire leads 146 with a compressive force, resultant from translation of the compressive force on the grommet 100 from the cap 74. In this way, the cap 74 compressively retains the grommet 100 to compress the grommet relative to the first face 80 and provides for an interference between the grommet 100 and the set of wire leads 146. Additionally, compressing the grommet 100 can seal the wire leads 146 at the nipples 108, compressing the nipples 108 against the cap 74, sealing the wire leads 146 at the nipples 108.

Furthermore, the compression of the cap 74 compresses the thickened portions 110 of the nipples 108 at the bevels 130 on the cap holes 128. This compression further seals the wire leads 146 at the nipples 108, while securing the wire leads 146 within the crimp pin electrical connector 60, resisting the wire leads 146 from being pulled out of the crimp pin electrical connector 60. In this way, the crimp pin electrical connector 60 both seals and secures the wire leads 146 in both an axial and radial compression direction, relative to a longitudinal axis 158 through the crimp pin electrical connector 60. Furthermore, the nipples 108 and the bevels 130 provides for strain relief on the wire leads 146, removing or reducing any potential sharp edges and replacing it with a resilient surface, which ensures that the built-in seals are undisturbed and provide for an additional level of sealing.

Removal of the wire leads 146 for replacement, inspection, or maintenance merely requires the user to unthread the nut 72, and remove the nut 72 and the cap 74 to decompress the wire leads 146. Therefore, the crimp pin electrical connector 60 provides for ease of maintenance and reusing of the crimp pin electrical connector 60, while other hermetic seals used often require discarding of the connector and costly replacement.

Additionally, the crimp pin electrical connector 60 can be tailored or customized, not currently available with other electrical connectors. More specifically, the grommet can be tailored for particular wire size or pin size, as well as material hardness to improve or increase sealing efficiency.

A method of coupling a set of wire leads 146 to a crimp pin electrical connector 60 including a body 62, a grommet 100, a cap 74, and a nut 72 can include: inserting the set of wire leads 146 through the nut 72, the cap 74, and the grommet to couple the set of wire leads 146 to the body 62; and threading the nut 72 to the body 62 to compressively retain the cap 74 against the grommet 100, compressing the grommet 100 between the body 62 and the cap 74; wherein compression of the grommet 100 retains and seals the set of wire leads 146 at the body 62.

Inserting the set of wire leads 146 through the nut 72, the cap 74, and the grommet 100 can include inserting the wire leads 146 through the nut opening 144, the cap holes 128, and the grommet holes 106. The method can further include compressing a set of nipples 108 on the grommet 100 with a set of bevels 130 on the cap holes 128 to seal the set of wire leads 146.

The components as described herein can be formed by additive manufacturing, such as 3D printing, direct metal laser melting, direct metal laser sintering, or electroforming, while other manufacturing methods are contemplated.

The crimp pin electrical connector 60 as described herein provides for a crimp pin connector that can be sealed to prevent leakage of a gas, liquid, or other substance through wire channels. The crimp pin electrical connector 60 utilizes a compressed grommet to seal around each wire to prevent the leakage through the wire channel. The particular grommet can be individually tailored to the particular connector to provide tailored sealing based upon wire size and material hardness, as well as based upon the local material to be sealed. Furthermore, the crimp pin electrical connector 60 provides for smaller sizing, which provides for reduced packaging and reduced occupied space, which can be extremely important in tight electronics implementations common to those in avionics applications. Further yet, the smaller sizing provides for less overall weight, which can provide for an improvement in specific fuel consumption in aircraft implementations.

The crimp pin electrical connector 60 also provides for improved simplicity. Typical, non-hermetic connectors have a small range at which they are able to seal from the elements, and can provide for wire damage or leakage with only a mild pressure gradient provided across the connector. The grommet 100 in the present crimp pin electrical connector 60 provides for a seal across a wide range of pressure gradients, as well as utilizes the nipples 108 and the bevels 130 to reduce wire strain. Furthermore, typical electrical connector backshells meant to provide environmental resistance rely on shrink-fit tubing, which can be difficult to package and assembly, as well as challenging to disassemble for maintenance or replacement. The present crimp pin electrical connector 60 provides for a reliable seal, while being easy to disassemble and reassemble. Further yet, typical hermetic seals utilize a seal material formed at the wire connection, and can include soldering the wire leads to the pins, which can requiring discarding and replacement of the electrical connector upon inspection or maintenance. The present crimp pin electrical connector 60 provides for easy removal for maintenance and inspection, and can be reused multiple times.

Many other possible configurations in addition to that shown in the above figures are contemplated by the present disclosure. To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A crimp pin connector comprising:
    a unitary body having a first face provided at a first end, and a second face provided at a second end, a set of openings extending through the body between the first face and the second face, and a first threaded portion about the body and positioned along the body between the first end and the second end;
    a grommet having a set of grommet holes corresponding to the set of openings extending through the body;
    a cap having a cap surface with a collar extending from the cap surface, having a set of cap holes provided in the cap surface and corresponding to the set of grommet holes; and
    a nut having an interior surface and having a second threaded portion, wherein the interior surface is positioned along the collar when the second threaded portion threadably engages with the first threaded portion and compressing the cap against the grommet;
    wherein a set of wires inserted through the set of openings in the body, the set of grommet holes, and the set of cap holes are sealed by the grommet by compression of the grommet against the first face by the nut.

2. The crimp pin connector of claim 1 wherein the grommet collapses about set of grommet holes when the cap compresses the grommet relative to the first face.

3. The crimp pin connector of claim 1 wherein the grommet comprises an outer surface from which extend a set of nipples which define grommet openings for the set of grommet holes.

4. The crimp pin connector of claim 3 wherein the set of nipples correspond to the set of cap holes and are received within corresponding cap holes.

5. The crimp pin connector of claim 3 wherein each nipple of the set of nipples includes a thickened portion.

6. The crimp pin connector of claim 5 wherein the cap further includes a bevel formed at each cap hole of the set of cap holes corresponding to the thickened portions of the set of nipples.

7. The crimp pin connector of claim 6 wherein the bevels compress the thickened portions of the set of nipples when the nut threadably engages the body.

8. The crimp pin connector of claim 1 wherein the collar is proximate a peripheral side of the grommet.

9. The crimp pin connector of claim 1 wherein the nut includes a rim overlying a portion of the cap when the nut is threadably mounted to the body.

10. The crimp pin connector of claim 9 wherein the rim defines a nut opening and at least one of the set of grommet holes and set of cap holes are accessible through the nut opening.

11. A crimp pin connector comprising:
    a body having a first end and an opposing second end, with a first face with a first set of openings at the first end and a first threaded portion about the body between the first end and the second end;
    a grommet having a first grommet end, a second grommet end opposite the first grommet end, and a set of grommet holes, extending between the first grommet end and the second grommet end, corresponding to the first set of openings when the grommet is proximate the first face;
    a cap having a set of cap holes corresponding to and aligned with the set of grommet holes, and a cap collar; and
    a nut having an interior surface positioned along the cap collar, and having a second threaded portion threadably engaged with the first threaded portion and compressing the cap against the grommet when the second threaded portion is threaded to the first threaded portion.

12. The crimp pin connector of claim 11 wherein the grommet comprises a set of nipples which define grommet openings for the set of grommet holes.

13. The crimp pin connector of claim 12 wherein each nipple of the set of nipples includes a thickened portion.

14. The crimp pin connector of claim 13 wherein the cap further includes a bevel formed at each cap hole of the set of cap holes corresponding to the thickened portions of the set of nipples when the cap is proximate the grommet.

15. The crimp pin connector of claim 14 wherein the bevels compress the thickened portions of the nipples when the nut threadably engages the body.

16. A method of coupling a set of wire leads to a crimp pin connector including a body having a first end with a first face, and a second end with a second face, a grommet, a cap, and a nut, the method comprising:
    inserting the set of wire leads through the nut, the cap, the grommet, and openings in the body extending between the first end and the second end to couple the set of wire leads to the body;
    threading the nut to the body at a set of threads between the first end and the second end of the body to compress the cap against the grommet, compressing the grommet against the body;
    sealing and retaining the set of wire leads at the body with the compressed grommet by threading the nut to the body to compressively retain the cap against the grommet; and
    compressing a set of nipples on the grommet with a set of bevels on the cap when threading the nut to the body to seal the set of wire leads at a covering of each of the set of wire leads.

* * * * *